(12) United States Patent
Popov

(10) Patent No.: US 6,398,918 B1
(45) Date of Patent: Jun. 4, 2002

(54) METHOD FOR DISTILLING A MIXTURE CONTAINING A PLURALITY OF COMPONENTS AND APPARATUS FOR REALIZING THE SAME

(75) Inventor: Serguei A. Popov, 4615 Post Oak Pl., Suite 140, Houston, TX (US) 77027

(73) Assignees: Evgueni D. Petroukhine, Limassol (CY); Serguei A. Popov, Budapest (HU)

(*) Notice: Subject to any disclaimer, the term of this patent is extended or adjusted under 35 U.S.C. 154(b) by 0 days.

(21) Appl. No.: 09/297,623

(22) PCT Filed: Sep. 2, 1998

(86) PCT No.: PCT/IB98/01368
§ 371 (c)(1),
(2), (4) Date: May 4, 1999

(87) PCT Pub. No.: WO99/11346
PCT Pub. Date: Mar. 11, 1999

(30) Foreign Application Priority Data

Sep. 4, 1997 (RU) ............................................. 97114998

(51) Int. Cl.$^7$ .............................. B01D 3/10; C10G 7/06
(52) U.S. Cl. ................................ 203/2; 203/94; 203/98; 203/100; 203/DIG. 14; 203/DIG. 25; 208/357; 208/358; 208/366
(58) Field of Search ................................ 203/21, 27, 2, 203/DIG. 8, DIG. 25, 100, 94, 98, DIG. 14; 202/205, 197, 160; 196/114; 208/350, 357, 358, 366, 184

(56) References Cited

U.S. PATENT DOCUMENTS

| | | | |
|---|---|---|---|
| 3,579,307 A | 5/1971 | Asahi et al. | |
| 3,796,640 A | 3/1974 | Sybron et al. | |
| 5,980,698 A | * 11/1999 | Abrosimov et al. | ........ 203/94 |
| 6,086,721 A | * 7/2000 | Tsegelsky | ........ 196/114 |

FOREIGN PATENT DOCUMENTS

| | | | |
|---|---|---|---|
| RU | 2050168 | 12/1995 | |
| RU | 2083639 | 7/1997 | |
| RU | 2084707 | * 7/1997 | ........ 2/2 |
| RU | 209220 | * 10/1997 | ........ 2/2 |
| RU | 2102103 | * 1/1998 | ........ 2/2 |
| SU | 724149 | 3/1980 | |
| SU | 910725 | 3/1982 | |
| SU | 1081197 | * 3/1984 | ........ 2/2 |
| SU | 1819645 | * 6/1993 | ........ 2/2 |
| WO | WO96/05900 | 2/1996 | |

* cited by examiner

Primary Examiner—Virginia Manoharan
(74) Attorney, Agent, or Firm—Mark A. Oathout

(57) ABSTRACT

Pertaining mainly to the field of the petrochemical industry the method essentially includes delivery of a motive liquid into a liquid-gas ejector from a separator by a pump, feeding a liquid-gas mixture obtained in the ejector into the separator, cooling of the motive liquid with simultaneous heating of a circulating portion of a distillation residual while the motive liquid is pumped through a heat-exchanger/heater by the pump, and maintaining such an operational mode while the temperature of mediums in the separator is higher than the temperature of the motive liquid at the nozzle inlet of the ejector, where the latter is higher than the temperature of the distillation residual at the point of discharge from a rectification column and the temperature of a gas-vapor phase at the gas inlet of the ejector is lower than the temperature of the distillation residual at the point of discharge from the column. The invention also relates to a system for realizing this method, which has a rectification column, a liquid-gas ejector, a pump, a heat exchanger and further is furnished with a separator. An outlet of the ejector and the suction side of the pump are connected to the separator, and the pump is connected to the nozzle inlet of the ejector through the heat-exchanger. The introduced method and system for realizing the same provide for increased profitability and efficiency of the distillation process of a multi-component mixture.

2 Claims, 1 Drawing Sheet

METHOD FOR DISTILLING A MIXTURE CONTAINING A PLURALITY OF COMPONENTS AND APPARATUS FOR REALIZING THE SAME

BACKGROUND

The present invention pertains to the field of distilling various multi-component mixtures, mainly to rectifying oil derivatives.

A method for distilling multi-component mixtures is known, which includes feeding a stock product into a rectification column, bleeding a gas-vapor phase from the top of the column and tapping a distillation residual from the bottom of the column. Under the method, the gas-vapor phase is evacuated from the column by a liquid-gas ejector (see, SU, certificate of authorship, 724149, cl. C 10 G 7/06, 1980).

A system realizing this method is also described in the mentioned certificate of authorship. The system contains a rectification column, a liquid-gas ejector and a pump. The inlet of the ejector nozzle is connected to the discharge side of the pump, the gas inlet of the ejector is connected to the pipeline for bleeding the gas-vapor phase from the column, and the column is also furnished with a pipeline for tapping the distillation residual.

In such method for distilling a multi-component mixture and the system for realizing the same, it is possible to effect a vacuum fractionation of multi-component mixtures. A vacuum required for the fractionation is created by the liquid-gas ejector. However, performance of the ejector in this system depends on a mode of reflux supply for the rectification column. Such is why in a number of cases the system is unable to provide the required vacuum in the rectification column or unable to ensure operation of the ejector in an optimal regime which results in increased energy consumption for maintaining the required vacuum.

The closest analogue of the method introduced by the present invention is a method for distilling a multi-component mixture including feeding a stock product into a rectification column, withdrawal of a distillation residual, ensuring circulation of a part of the residual with heating of this part of the residual in a heat-exchanger/heater, evacuation of a gas-vapor phase from the rectification column by a liquid-gas ejector, whose nozzle is fed with a liquid motive medium (see, SU, certificate of authorship, 910725, cl. C 10 G 7/06, 1982).

The indicated USSR certificate of authorship No. 910725 describes also a system for distilling a multi-component mixture, which is the closest analogue of the system introduced by the present invention. It contains a rectification column, a liquid-gas ejector, a pump and a heat-exchanger/heater. The inlet of the ejector nozzle is connected to the discharge side of the pump, the gas inlet of the ejector is connected to the pipeline for bleeding the gas-vapor phase from the column, the column is furnished with a pipeline for circulation of the distillation residual and the heat-exchanger/heater is installed on this pipeline.

According to the USSR certificate of authorship No. 910725, the vacuum in the rectification column is created by the liquid-gas ejector, which uses the reflux fraction as a motive liquid. The motive liquid is cooled during operation in a special cooler, while a part of the circulating residual is heated up in a boiler. Thus, the process requires significant power inputs for simultaneous heating and cooling of various mediums, and the off-heat and off-<cold> are not utilized.

SUMMARY OF THE INVENTION

The present invention is aimed at increasing efficiency and profitability of a method and related system for distilling multi-component mixtures, which can be achieved by optimizing temperatures of various mediums involved in the process in relation to each other as well as by a more rational utilization of thermal flows, namely by the use of a surplus heat accumulated by a motive liquid for heating of a circulating part of the distillation residual.

With regard to the method as the subject-matter of the invention the above mentioned resolution is provided by a method for distilling a multi-component mixture, which includes feeding of a stock product into a rectification column, withdrawal of a distillation residual, ensuring circulation of a part of the residual with heating of the circulating residual in a heat-exchanger/heater and evacuation of a gas-vapor phase from the rectification column by a liquid-gas ejector, whose nozzle is fed with a motive liquid, wherein the motive liquid is delivered into the ejector from a separator by a pump, a liquid-gas mixture from the ejector is fed into the separator, the motive liquid is cooled and simultaneously the circulating part of the residual is heated up due to heat transfer from the motive liquid being pumped through the heat-exchanger/heater by the pump, a part of the motive liquid from the separator is delivered into the rectification column as a circulating reflux, and the following temperature conditions are maintained: $T_C > T_H > T_b > T_d$, where $T_C$ is the temperature of the mediums in the separator;

$T_H$ is the temperature of the motive liquid at the inlet of the ejector nozzle;

$T_b$ is the temperature of the distillation residual at the point of exit from the column;

$T_d$ is the temperature of the gas-vapor phase at the ejector gas inlet.

It is possible to arrange ebullition of the motive liquid during discharge of the liquid from the ejector nozzle (for example, as known by one of ordinary skill in the art, by maintaining a temperature of the motive liquid which is higher than the boiling point of this liquid under the decreased pressure being maintained in the ejector receiving chamber).

With regard to the apparatus as the subject-matter of the invention, the mentioned technical problem is solved as follows: a system for distilling a multi-component mixture, which has a rectification column, a liquid-gas ejector, a pump and a heat-exchanger/heater and where the inlet of the ejector nozzle is connected to the discharge side of the pump, the gas inlet of the ejector is connected to the pipeline for bleeding a gas-vapor phase from the column and the heat-exchanger/heater is installed on a pipeline for circulation of a distillation residual connected to the column, is furnished further with a separator, where an outlet of the ejector and the suction side of the pump are connected to the separator, the pump is connected to the ejector nozzle through the heat-exchanger/heater.

Experimental research has shown, that correlation of the following temperatures produces a significant effect on the performance of the system for distilling a multi-component mixture: the temperature of the gas-vapor phase, the temperature of the distillation residual, the temperature of the motive liquid at the inlet of the ejector nozzle and the temperature of the motive liquid in the separator.

It was determined, that optimum conditions for operation of the liquid-gas ejector as an element of the introduced system are attained when the system includes a separator, where an outlet of the ejector and the suction side of the pump are connected to the separator, and when the temperature of a motive liquid at the inlet of the ejector nozzle is higher than the temperature of a gas-vapor phase at the ejector gas inlet, and the temperature of mediums in the separator is higher than the temperature of the motive liquid at the inlet of the ejector nozzle. It was found, that under the above specified conditions compression of the gas-vapor phase in the ejector constitutes a quasi-isothermal process, i.e. the process during which temperature rises only by 2–5° C. At the same time, more intensive dissolution of the evacuated gas-vapor medium in the motive liquid takes place if the temperature of the supplied liquid is higher than temperature of the gas-vapor phase. This is especially preferable when a condensate of the gas-vapor phase obtained in the separator during evacuation of the gas-vapor phase from the rectification column is used as the motive liquid, or in a case when a distillate from the rectification column is used at first as the motive liquid, but then is replaced gradually by the condensate of the gas-vapor phase as it is accumulated during operation of the system. Because a part of the gas-vapor phase whose composition is cognate to the composition of the motive liquid is dissolved in the motive liquid during mixing of the mediums in the ejector, it is possible to solve two problems at once: to increase the yield of a desired liquid product during distillation and to reduce the load on the separator during separation of a gas-liquid mixture into the motive liquid and compressed gas.

An additional increase in the overall efficiency of the ejector is attained due to ebullition of the motive liquid during its discharge from the ejector nozzle. Discharge of the ebullient liquid from the nozzle, on the one hand, reduces energy losses during mixing of the gas-vapor phase and the motive liquid and, on the other hand, provides more intensive dissolution of the condensed part of the gas-vapor phase whose composition is cognate to the composition of the motive liquid. Condensation of the gas-vapor phase and dissolution of the condensate in the motive liquid take place during mixing and compression of the mediums in the ejector.

Except for the above listed benefits, the maintaining of the offered correlation of temperatures during distillation of a multi-component mixture together with connecting the pump to the ejector nozzle through the heat-exchanger/heater allow heat transfer from the motive liquid to the circulating portion of the distillation residual, which significantly increases profitability and efficiency of the distillation process.

Thus, the introduced method and the system implementing the same ensure more profitable and effective distillation of multi-component mixtures.

BRIEF DESCRIPTION OF THE DRAWINGS

The drawing represents a basic diagram of the system, which realizes the described method for distilling a multi-component mixture.

DETAILED DESCRIPTION

Figure 1:
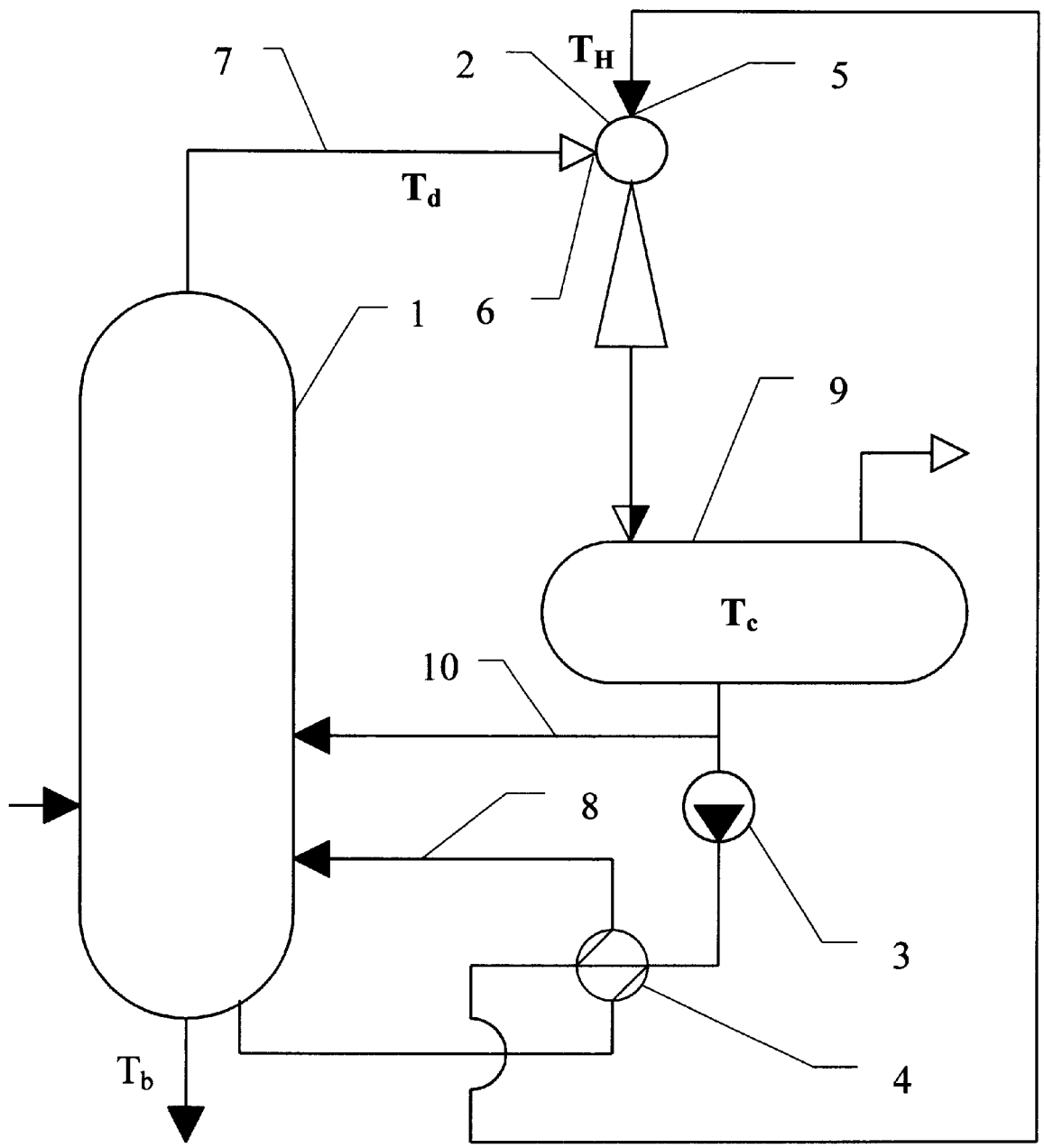

The system for distilling a multi-component mixture has a rectification column 1, a liquid-gas ejector 2, a pump 3 and a heat-exchanger/heater 4. The nozzle inlet 5 of the ejector 2 is connected to the discharge side of the pump 3, the gas inlet 6 of the ejector 2 is connected to a pipeline 7 for bleeding a gas-vapor phase from the rectification column 1, the column 1 is furnished with a pipeline 8 for circulation of a distillation residual, and the heat-exchanger/heater 4 is installed on this pipeline 8. In addition, the system is equipped with a separator 9. An outlet of the ejector 2 and the suction side of the pump 3 are connected to the separator 9. The separator 9 is connected to the rectification column 1 by means of a pipeline 10, the pump 3 is connected through the heat-exchanger/heater 4 to the nozzle inlet 5 of the ejector 2.

The described method for distilling a multi-component mixture is realized as follows.

A stock product is fed into the rectification column 1, where it is cut into a distillate and a distillation residual. Evaporation required to enforce the distillation is effected in the heat-exchanger/heater 4 while passing of a portion of the residual through the heat-exchanger/heater 4. The portion of the residual is fed into the heat-exchanger 4 through the pipeline 8. The liquid-gas ejector 2 provides a vacuum in the rectification column 1 and evacuation of a gas-vapor phase from the column 1 through the pipeline 7. A motive liquid is delivered into the ejector nozzle from the separator 9 by the pump 3.

Flowing out of the nozzle of the ejector 2, the motive liquid entrains the gas-vapor phase from the column 1 into the ejector 2 and mixes with the gas-vapor phase. Simultaneously, practically isothermal compression of the evacuated gas-vapor phase takes place in the ejector 2. During mixing the gas-vapor phase or its portion whose composition and physical parameters (such as, for example, boiling temperature or saturated vapor pressure) are cognate to those of the motive liquid, is dissolved in the motive liquid. A mixture of the gas-vapor phase and the motive liquid obtained in the ejector 2 flows into the separator 9, where the mixture is separated into a compressed gas (if any) and the motive liquid. The compressed gas is delivered to consumers according to its purpose, and the motive liquid is delivered again into the nozzle 5 of the liquid-gas ejector by the pump 3. A part of the motive liquid from the separator 9 is fed into the column 1 through pipeline 10 as a circulating reflux. Prior to entry into the nozzle of the ejector 2, the motive liquid is cooled down a to required working temperature in the heat-exchanger/heater 4. At the same time, the circulating part of the distillation residual from the rectification column 1 is heated up in the heat-exchanger/heater 4 due to heat transfer from the motive liquid passing through the heat-exchanger/heater 4.

There is a variant of operation of the ejector 2, when the motive liquid comes to ebullition during discharge from the nozzle of ejector 2. In this case evacuation of the gas-vapor phase is carried out by a steam or liquid-steam flow of the active medium. While mixing and compressing the mixture of the gas-vapor phase and active medium flow, the liquid-vapor mixture is condensed as far as its pressure increases. This forms a liquid or gas-liquid flow, which passes from the ejector 2 into the separator 9. In all other aspects the operation of the system in this case is the same.

Once again it must be noted, that maintaining the stated correlation of temperatures, i.e. maintaining conditions where the temperature ($T_C$) of mediums in the separator 9 is higher than the temperature ($T_H$) of the motive liquid at the nozzle inlet 5 of the ejector 2, where the latter is higher than the temperature ($T_b$) of the distillation residual at the point of discharge from the column 1, and the temperature ($T_d$) of the gas-vapor phase at the gas inlet 6 of the ejector 2 is lower than the temperature ($T_b$) of the distillation residual at the point of discharge from the column 1.

Industrial Applicability

The present invention can be applied in chemical, petrochemical and some other industries.

What is claimed is:

1. In a method for distilling a multi-component mixture, including feeding a stock product into a rectification column, withdrawing a distillation residual from the rectification column, circulating a portion of the residual and heating the circulated portion of the residual in a heat-exchanger/heater, evacuating a gas-vapor phase from the rectification column by a liquid-gas ejector, and feeding a nozzle of the ejector with a motive liquid, the improvement comprising the steps of:

feeding the motive liquid into the ejector from a separator by a pump, feeding a liquid-gas mixture from the ejector into the separator, cooling the motive liquid and simultaneously heating the circulated portion of the residual by transferring heat from the motive liquid by pumping the motive liquid through the heat-exchanger/heater, delivering a part of the motive liquid from the separator into the rectification column as a circulating reflux and maintaining temperature conditions, having $T_C > T_H > T_b > T_d$, wherein $T_C$ is the temperature of mediums in the separator;

$T_H$ is the temperature of the motive liquid at the ejector nozzle inlet;

$T_b$ is the temperature of the distillation residual at the point of discharge from the column; and $T_d$ is the temperature of the gas-vapor phase at the ejector gas inlet.

2. The method according to claim 1, further including outflowing the motive liquid from the ejector nozzle in a state of ebullition.

* * * * *